United States Patent [19]

Hager et al.

[11] Patent Number: 5,377,355

[45] Date of Patent: Dec. 27, 1994

[54] METHOD AND APPARATUS FOR AUTOMATED PROCEDURE INITIATION IN A DATA PROCESSING SYSTEM INCLUDING SOLICITING AN EVALUATION VOTE FROM USERS AUTOMATICALLY DETERMINED IN RESPONSE TO IDENTIFICATION OF A FUNCTIONAL AREA ASSOCIATED WITH A DOCUMENT

[75] Inventors: Dean J. Hager; Curtis G. Rose, both of Rochester, Minn.

[73] Assignee: International Business Machines Corporation, Armonk, N.Y.

[21] Appl. No.: 107,423

[22] Filed: Aug. 16, 1993

Related U.S. Application Data

[63] Continuation of Ser. No. 579,825, Sep. 10, 1990, abandoned.

[51] Int. Cl.⁵ .............................................. G06F 15/20
[52] U.S. Cl. ..................................... 395/650; 395/145; 395/149; 395/200; 364/DIG. 1; 364/284; 364/284.3; 364/284.4; 364/286; 364/281.3; 364/281.8
[58] Field of Search ............... 395/200, 600, 145, 146, 395/149, 650; 364/400, 401, 419.19

[56] References Cited

U.S. PATENT DOCUMENTS

| | | | |
|---|---|---|---|
| 4,503,499 | 3/1985 | Mason et al. | 395/650 |
| 5,040,142 | 8/1991 | Mori et al. | 364/507 X |
| 5,063,495 | 11/1991 | MacPhail | 395/650 |
| 5,070,470 | 12/1991 | Scully et al. | 364/705.08 |
| 5,089,956 | 2/1992 | MacPhail | 395/600 |
| 5,101,345 | 3/1992 | MacPhail | 395/600 |
| 5,107,419 | 4/1992 | MacPhail | 395/600 |
| 5,125,075 | 6/1992 | Goodale et al. | 395/200 |
| 5,142,678 | 8/1992 | MacPhail | 395/650 |

FOREIGN PATENT DOCUMENTS

0306781A3  3/1989  European Pat. Off. ..... H04L 11/20

OTHER PUBLICATIONS

IBM Systems Journal vol. 21 No. 3, 1982, V. Y. Lum et al. "OPAS: An Office Procedure Automation System".
Proceedings of the Sixteenth Annual Hawaii International Conference on System Sciences, 1983, Hiltz et al., pp. 581–589 "Avoiding Information Overload In The Electronic Office".
IEEE Transactions on Communications, vol. COM-30, No. 1, Jan. 1982 "A System For Managing Structured Messages", Tsichritzis, et al., pp. 66–73.
Computer Journal, vol. 26, No. 1, Feb. 1983, N. H. Gehani "High Level Form Definition in Office Information Systems", pp. 52–59.

*Primary Examiner*—Paul V. Kulik
*Attorney, Agent, or Firm*—James H. Barksdale; Andrew J. Dillon

[57] ABSTRACT

The method and apparatus of the present invention may be utilized to automatically initiate additional procedures in a data processing system with regard to documents stored therein. A selected document, such an invention disclosure document, is identified and evaluations of the selected document are automatically solicited from a selected group of evaluators enrolled within the data processing system. In one embodiment of the present invention the evaluators are automatically selected in response to the technical or functional subject matter of the document. Each evaluation of a document is then stored and the content of all evaluations are then utilized to automatically initiate an additional procedure. For example, if a majority of evaluations indicate that a selected document should be closed, the file is automatically closed and a report is automatically generated indicating this action. Similarly, a number of evaluations indicating a request for additional information may be utilized, in accordance with the method and apparatus of the present invention, to automatically initiate a search request directed to an appropriate search facility. A display of a summary of all evaluations is also preferably provided so that a computer user may override or counterman the automatic initiation of a selected procedure.

8 Claims, 6 Drawing Sheets

INVENTION DISCLOSURE EVALUATION REPORT

110

112 — DISCLOSURE NO. _____ DATE _____ TIME _____

EVALUATOR: JOE EVALUATOR

CHAIRMAN: SAM CHAIRMAN

114 — I VOTE THAT THIS DISCLOSURE BE RATED AS FOLLOWS:

SEARCH    PUBLISH    CLOSE    DON'T KNOW    ABSTAIN
_____   _____   _____  _____   _____

116 — I HAVE READ AND UNDERSTAND THE ENTIRE INVENTION DISCLOSURE:

YES _____    NO _____

118 — IS FURTHER DISCUSSION NECESSARY:

YES _____    NO _____

120 — MY LEVEL OF EXPERTISE (1=UNFAMILIAR, 10=EXPERT): _____

122 — COMMENTS _____
_____
_____
_____
_____

*Fig. 5*

METHOD AND APPARATUS FOR AUTOMATED PROCEDURE INITIATION IN A DATA PROCESSING SYSTEM INCLUDING SOLICITING AN EVALUATION VOTE FROM USERS AUTOMATICALLY DETERMINED IN RESPONSE TO IDENTIFICATION OF A FUNCTIONAL AREA ASSOCIATED WITH A DOCUMENT

This is a continuation of application Ser. No. 07/579,825, filed Sep. 10, 1990, now abandoned.

CROSS REFERENCE TO RELATED APPLICATIONS

This application is related to U.S. Pat. No. 5,247,661, entitled "Method and Apparatus for Automated Document Distribution in a Data Processing System," U.S. patent application Ser. No. 07/579,473, entitled "Method and Apparatus for Automated Meeting Agenda Generation in a Data Processing System, " U.S. Pat. No. 5,276,869, entitled "Method and Apparatus for Electronic Corroboration of Documents in a Data Processing System," all filed of even date herewith and assigned to the assignee hereof, and incorporated by reference herein.

BACKGROUND OF THE INVENTION

1. Technical Field

The present invention relates in general to an improved data processing system and in particular to a method and system for automatically initiating additional procedures within a data processing system. Still more particularly, the present invention relates to a method and apparatus for automatically generating reports and initiating additional procedures with regard to a document within a data processing system in response to stored evaluators of that document.

2. Description of the Related Art

The modern electronic office is rapidly supplanting and replacing many aspects of the traditional paper office. Modern office systems utilize electronic mail, voice mail, centralized databases and other forms of electronic communication to decrease the amount of so-called "float" encountered in a traditional paper society. By utilizing electronic mail it is possible for a document to be simultaneously transmitted to multiple recipients at various points around the world. Despite the advent of widespread electronic communication, selected activities within the traditional paper office have been difficult to implement in an electronic society.

For example, the automatic initiation of procedures in a data processing system in response to an external stimulus is well known in the art. Alarm circuits are known which may be utilized to control the initialization or termination of various security procedures. Similarly, access code programs are often utilized to permit a computer user accessed to a building, office or file in response to the entry by the computer user of an appropriate security code. However, the initiation of one or more of a plurality of different procedures based upon the existence or nonexistence of multiple factors is not possible in the prior art. Thus, the initiation of a data processing procedure based upon anything more than a simple presence or absence of a particular signal or code is unknown in the art.

Those skilled in the electronic office art appreciate that it would be highly desirable to implement one of a plurality of different procedures based upon the substantive content of a document or a group of documents. Such an advance in the data processing system art would greatly enhance the efficiency of the electronic office and permit a much larger amount of clerical work to be automated without the necessity of human intervention.

Therefore, it should be apparent that a need exists for a method and apparatus which permits the automatic initiation of additional procedures within a data processing system in response to a complex set of parameters.

SUMMARY OF THE INVENTION

It is therefore one object of the present invention to provide an improved data processing system.

It is another object of the present invention to provide an improved data processing system which permits automatic initiation of additional procedures in a data processing system.

It is yet another object of the present invention to provide an improved data processing system which permits the automatic generation of reports and the automatic initiation of additional procedures with regard to a document which is stored within a data processing system in response to stored evaluations of that document.

The method and apparatus of the present invention may be utilized to automatically initiate additional procedures in a data processing system with regard to documents stored therein. A selected document, such an invention disclosure document, is identified and evaluations of the selected document are automatically solicited from a selected group of evaluators enrolled within the data processing system. In one embodiment of the present invention the evaluators are automatically selected in response to the technical or functional subject matter of the document. Each evaluation of a document is then stored and the content of all such evaluations are then utilized to automatically initiate an additional procedure. For example, if a majority of evaluations indicate that a selected document should be closed, the file is automatically closed and a report is automatically generated indicating this action. Similarly, a number of evaluations indicating a request for additional information may be utilized, in accordance with the method and apparatus of the present invention, to automatically initiate a search request directed to an appropriate search facility. A display of a summary of all evaluations is also preferably provided so that a computer user may override or countermand the automatic initiation of a selected procedure.

BRIEF DESCRIPTION OF THE DRAWING

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 is a pictorial representation of a computer screen which may be utilized to prompt a computer user to evaluate an electronic invention disclosure document in accordance with the method and apparatus of the present invention;

DETAILED DESCRIPTION OF PREFERRED EMBODIMENT

Figure 1:
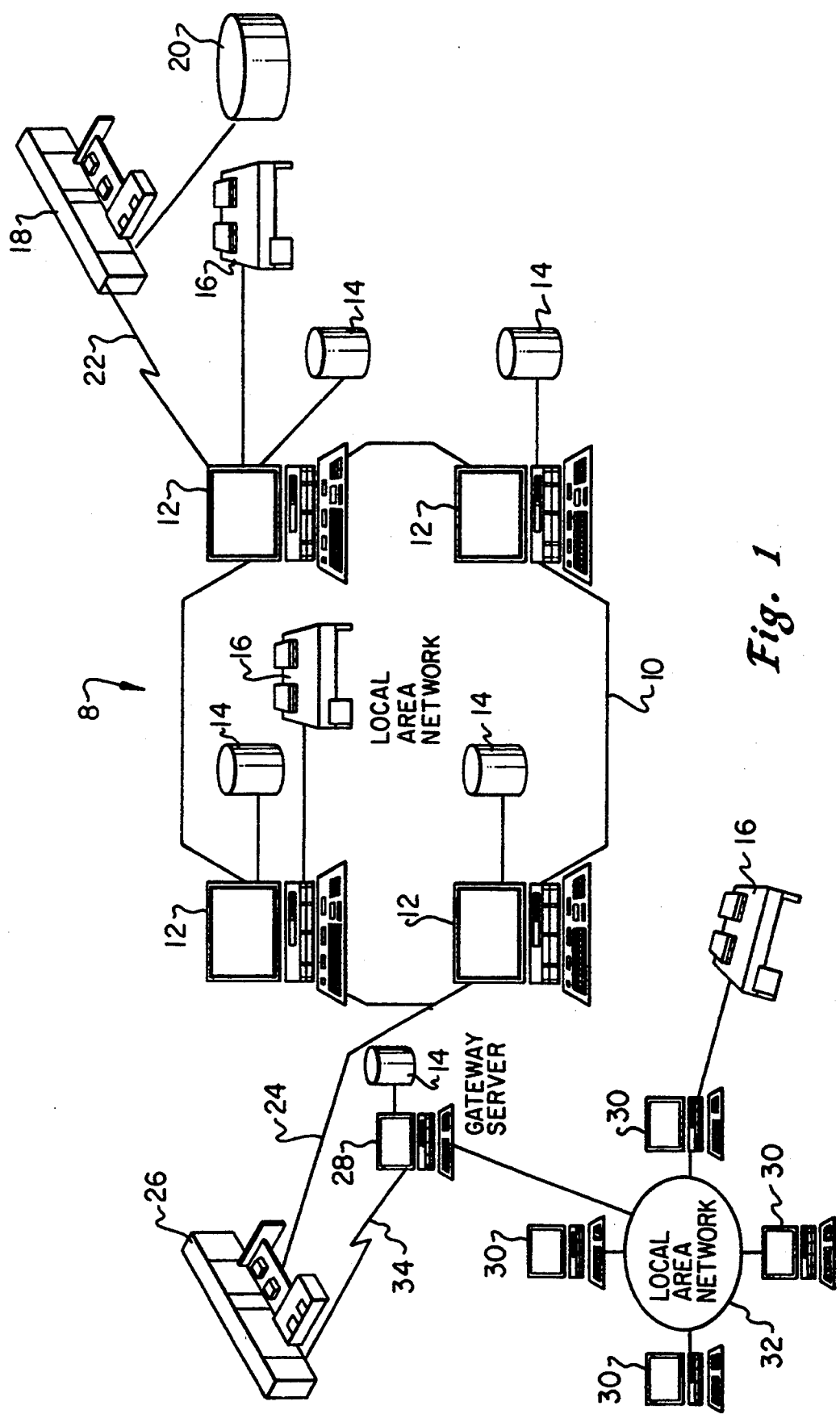
FIG. 1 is a pictorial representation of a distributed data processing system which may be utilized to implement the method of the present invention.

With reference now to the figures and particular with reference to FIG. 1, there is depicted a pictorial representation of a data processing system 8 which may be utilized to implement the method of the present invention. As may be seen, data processing system 8 may include a plurality of networks, such as Local Area Networks (LAN) 10 and 32, each of which preferably includes a plurality of individual computers 12 and 30, respectively. Of course, those skilled in the art will appreciate that a plurality of Intelligent Work Stations (IWS) coupled to a host processor may be utilized for each such network.

As is common in such data processing systems, each individual computer may be coupled to a storage device 14 and/or a printer/output device 16. One or more such storage devices 14 may be utilized, in accordance with the method of the present invention, to store the various documents which may be periodically accessed, processed and/or transmitted by a user within data processing system 8, and thereafter utilized to automatically generate a meeting agenda in accordance with the method of the present invention. In a manner well known in the prior art, each such document may be stored within a storage device 14 which is associated with a Resource Manager or Library Service, which is responsible for maintaining and updating all documents associated therewith.

Still referring to FIG. 1, it may be seen that data processing network 8 also include multiple central computer systems, such as central computer system 18, which may be preferably coupled to Local Area Network (LAN) 10 by means of communications link 22. In the preferred embodiment, central computer system 18 is an IBM System/370, although other computer systems, such as an IBM Application System/400 or PS/2 could also be used. In addition, central computer system 18 is not necessary if one or more local area networks are sufficient to connect all desired users. Central computer system 18 may also be coupled to a storage device 20 which may also serve as remote storage for Local Area Network (LAN) 10. Similarly, Local Area Network (LAN) 10 may be coupled via communications link 24 through a subsystem control unit/communications controller 26 and communications link 34 to gateway server 28. Gateway server 28 Is preferably an individual computer or Interactive Work Station (IWS) which serves to link Local Area Network (LAN) 32 to Local Area Network 10 such that electronic mail messages may be easily transmitted and received between individuals within either network.

As discussed above with respect to Local Area Network (LAN) 32 and Local Area Network (LAN) 10, a plurality of documents may be stored within storage device 20 and controlled by central computer system 18, as Resource Manager or Library Service for the documents thus stored. Of course, those skilled in the art that central computer system 18 may be located a great geographical distance from Local Area Network (LAN) 10 and similarly Local Area Network (LAN) 10 may be located a substantial distance from Local Area Network (LAN) 32. That is, Local Area Network (LAN) 32 may be located in California, while Local Area Network (LAN) 10 may be located in Texas and central computer system 18 may be located in New York.

As will be appreciated upon reference to the foregoing, it is often desirable for users within one portion of distributed data processing network 8 to be able to create or select a document for transfer to other users within data processing network 8. This is generally accomplished utilizing any suitable software application which permits documents, notes or other collections of data to be transmitted or received throughout data processing network 8. Examples of such applications are PROFS, OfficeVision, or CMS note facility used by IBM computers. In the case of invention disclosure documents or other similar documents, the method and apparatus of the present invention will permit an electronic corroboration of such documents to be obtained at a subsequent time.

Figure 2:
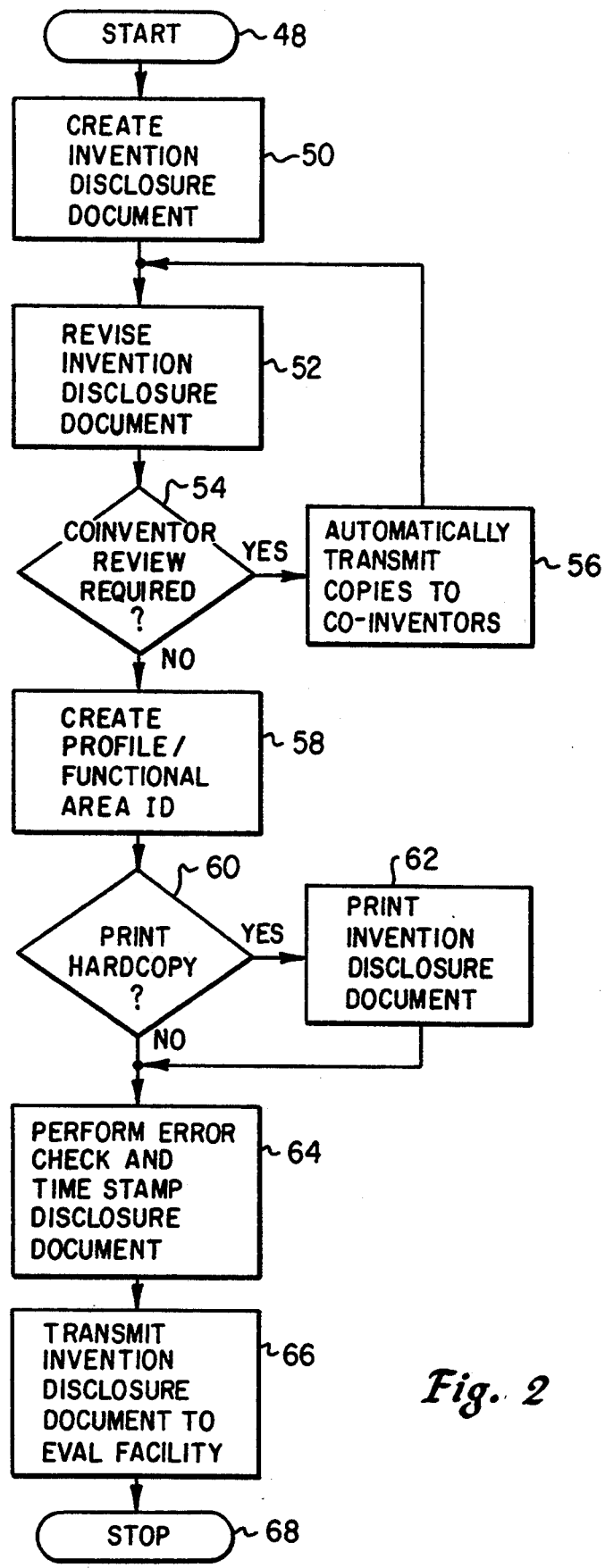
FIG. 2 is a high level flow chart depicting the creation of an electronic invention disclosure document which may be automatically distributed and evaluated in accordance with the method and apparatus of the present invention.

Referring now to FIG. 2, there is depicted a high level flow chart which illustrates the creation of an electronic invention disclosure document which may be automatically distributed in accordance with the method and apparatus of the present invention. As is illustrated, the process begins at block 48 and thereafter passes to block 50 which depicts the creation of an invention disclosure document. In the preferred embodiment, the user is prompted for personal information about each inventor, critical dates information about statutory bar dates, and information about the problem solved and the solution. Next, block 52 gives the user the opportunity to revise the invention disclosure document, if such revision is necessary. Block 54 depicts a determination of whether or not co-inventor review is required and if so, the process passes to block 56 which illustrates the automatic transmission of copies of the invention disclosure document to each listed co-inventor. Next, the process returns to block 52 to illustrate the review and revision of the invention disclosure document based upon input from one or more co-inventors.

If, as a result of the determination illustrated in block 54, no additional co-inventor review is required, or all co-inventors have reviewed the invention disclosure document, then the process passes to block 58 which depicts the creation of a document profile/functional area identification. Those skilled in the art will appreciate that the creation of this profile may be accomplished coincident with the creation of the invention disclosure by providing a form document which includes one or more data entry blanks which permit the creator of the document to identify the document by subject matter, author and functional area. Alternatively, as discussed herein, the creator of an invention disclosure document may be presented with a menu screen which lists multiple functional areas from which the document creator may select an appropriate listing. Similarly, a functional area identification may be automatically assigned in response to an examination of personal information inputted for each inventor, such as department number, division, building, et cetera, by correlating the employee's division or department with a functional area identification.

Next, block 60 illustrates a determination of whether or not it is desired to create a hard copy of the invention disclosure document. If so, the process passes to block 62 which depicts the printing of a hard copy of the invention disclosure document. At this point, block 64 depicts the determination of whether or not the invention disclosure document is now in final form and ready to be submitted to an evaluation facility by the performance of an automated error check to determine if all required data for a complete invention disclosure document has been entered. A date/time stamp is also automatically assigned to each invention disclosure document to assist in the management and corroboration of such documents. Thereafter, block 66 illustrates the transmission of the invention disclosure document to an evaluation facility and the process terminates, as depicted in block 68.

While the method and apparatus of the present invention will find application in the automated distribution of any electronic document, the illustrated example discloses the distribution of invention disclosure documents. Accordingly, the revised invention disclosure document and its associated profile/functional area identification information will thereafter be transmitted to an intellectual property law facility for further processing.

In alternate embodiments of the present invention wherein the electronic document to be distributed is a suggestion, the preceding description is also applicable; however, the term "inventor" should be replaced by "suggestor." Further processing of a suggestion will be done by a suggestion evaluation facility, rather than an intellectual property law facility as described herein.

Referring again to FIG. 1, it should be apparent to those skilled in the art that an evaluation facility for such documents may be located at any point within data processing network 8. Often a centralized evaluation facility is utilized for such documents; however, many large corporate entities utilize a decentralized evaluation facility wherein all invention disclosure documents from a particular geographic area are routed to a local evaluation facility.

Figure 3:
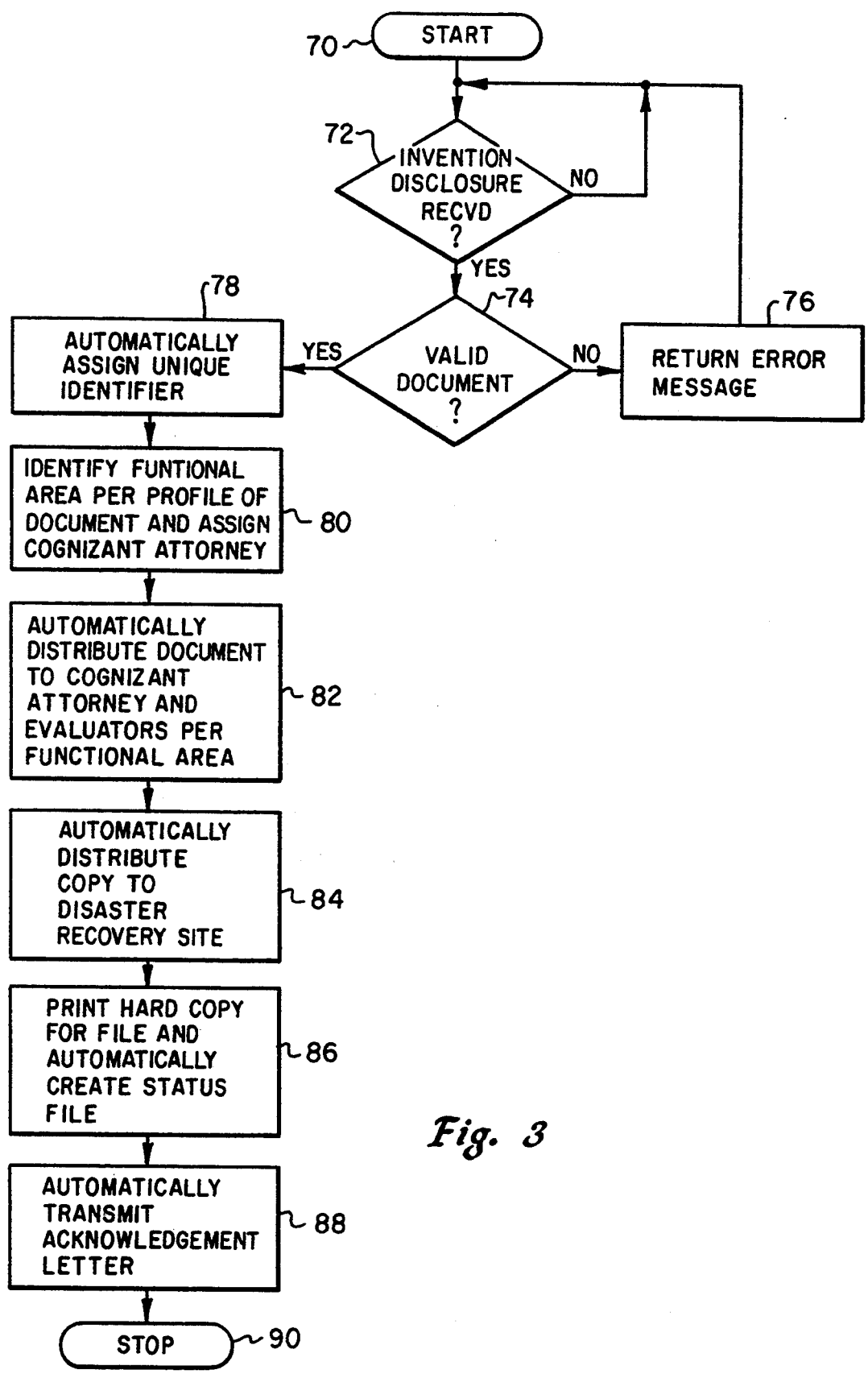
FIG. 3 is a high level flow chart depicting the automatic distribution of an electronic invention disclosure document in accordance with the method and apparatus of the present invention.

With reference now to FIG. 3, there is illustrated a high level flow chart which depicts the automatic distribution of an electronic invention disclosure document for evaluation and corroboration, in accordance with the method and apparatus of the present invention. As is depicted, this process begins at block 70 and thereafter passes to block 72 which illustrates a determination of whether or not an invention disclosure document has been received at the evaluation facility. If not, the process merely iterates until such time as this event occurs. After receiving an invention disclosure document at the evaluation facility, block 74 depicts the determination of whether or not the document received is a valid invention disclosure document. That is, whether or not the invention disclosure document is organized in the desired format and includes all required information. If the document received is not valid, an error message is generated, as illustrated in block 76, and the process returns to block 72 to await the receipt of a subsequent invention disclosure document. Next, block 78 depicts the automatic assigning of a unique identifier, such as a disclosure number, to be associated thereafter with the invention disclosure document. In the preferred embodiment, the disclosure number includes an indication of the year the disclosure was received and a four digit number beginning at "0001" and sequentially incrementing each time a new disclosure is received.

At this point, block 80 illustrates the identification of the functional area for the invention disclosure document from the profile information contained with the document and the automatic assignment of a cognizant attorney. Thereafter, block 82 illustrates the automatic distribution of the invention disclosure document to the cognizant attorney and one or more preselected evaluators, determined in accordance with the functional area information contained within the document profile which was developed as discussed herein. This is accomplished by automatically creating a distribution list of appropriate evaluators, along with corresponding electronic addresses, in response to the aforementioned functional area information. In this manner, an invention disclosure document may be efficiently and automatically distributed to a plurality of evaluators for a determination as to the eventual status of the invention disclosure document.

Block 84 then illustrates the automatic distribution of a copy of the invention disclosure document to a disaster recovery site. In this manner, should a fire, earthquake, flood, or other disaster befall the facility which has been utilized to store an invention disclosure document, a copy of that document may be retrieved from a designated disaster recovery site.

Next, block 86 depicts the printing of a hard copy of the invention disclosure document for use in paper files and the automatic creation of a status file to be associated with the uniquely identified invention disclosure document. This status file may be utilized to provide a method for determining the status of an invention disclosure document at any given time. For example, the status file will typically contain the date upon which an invention disclosure document was distributed for evaluation, the dates each evaluator returned a response and any dates which must be met to preserve patentability.

Thereafter, block 88 illustrates the automatic transmission of an acknowledgement letter. Acknowledgement letters are typically sent to the inventors of each invention disclosure document and their management indicating that the document has been received at the evaluation facility and that the document has been distributed for evaluation. Thereafter, this process terminates, as illustrated in block 90.

Figure 4:
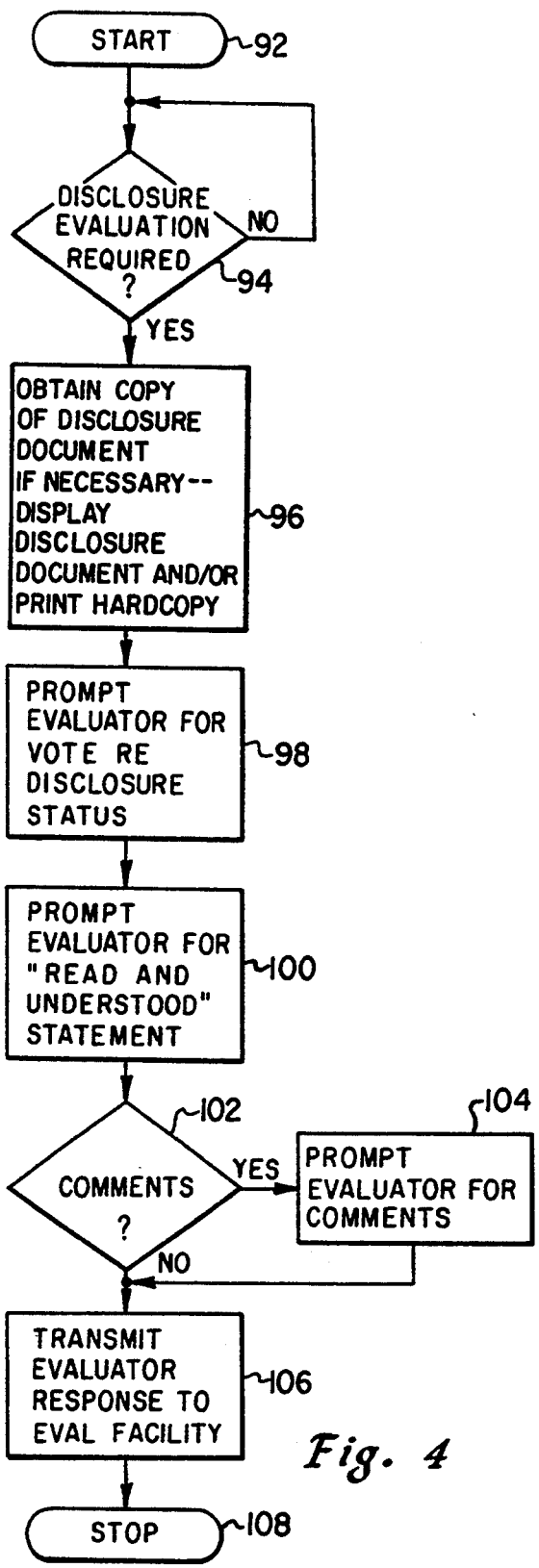
FIG. 4 is a high level flow chart depicting the evaluation of an electronic invention disclosure document in accordance with the method and apparatus of the present invention.

Referring now to FIG. 4, there is depicted a high level flow chart which illustrates the evaluation and corroboration of an electronic invention disclosure document in accordance with the method and apparatus of the present invention. As above, the process illustrated in FIG. 4 begins at block 92 and thereafter passes to block 94. Block 94 depicts a determination of whether or not an invention disclosure document evaluation request has been received by an evaluator. If not, the process merely iterates until such time as a request for an evaluation of an invention disclosure document is received.

After receiving a request for an invention disclosure document evaluation, block 96 illustrates the obtaining of a copy of the invention disclosure document and the displaying of the disclosure document to the evaluator and/or the printing of a hard copy thereof. Those skilled in the art will appreciate that this may be accomplished utilizing any suitable word processing or text display technique, such as Xedit or browse capability of IBM Operating System CMS. After displaying the disclosure document to the evaluator, block 98 illustrates the prompting of the evaluator for a vote with regard to the proposed status of the invention disclosure document. In the depicted embodiment of the present invention an evaluator may vote to initiate a search of the technology disclosed within the invention disclosure document to investigate possible patentability. The evaluator may also vote to publish the document, close the file, abstain from a vote with regard to a particular invention disclosure document.

Next, block 100 depicts the prompting of the evaluator for a "Read and Understood" statement. This is accomplished, in the depicted embodiment of the present invention, by presenting a computer screen to the evaluator which asks whether the evaluator has read and understood the entire invention disclosure. This prompt requires the evaluator to enter an indication of "yes" or "no" in response to this statement.

Additionally, block 102 illustrates a determination of whether or not the evaluator wishes to enter a comment with regard to an invention disclosure document, in addition to a simple vote and/or corroboration. If so, block 104 depicts the prompting of the evaluator to enter his comments. These comments may be utilized by the Chairman of an Evaluation Committee for a determination of how strongly the evaluator feels with regard to his or her vote, or as part of an agenda to be distributed prior to a scheduled meeting to discuss one or more invention disclosure documents.

Thereafter, block 106 illustrates the transmission of the evaluator's response and comments to the evaluation facility for utilization by the Chairman of the Evaluation Committee. At this point, the process terminates, as illustrated in block 108.

With reference now to FIG. 5, there is depicted a pictorial representation of a computer screen which may be utilized to prompt a computer user to evaluate and corroborate an electronic invention disclosure document in accordance with the method and apparatus of the present invention. As is illustrated, computer screen 110 depicts an INVENTION DISCLOSURE EVALUATION REPORT screen which may be generated for utilization with the method and apparatus of the present invention. At line 112 therein a disclosure number, that is, the unique identification assigned to this disclosure at the evaluation facility, may be entered along with the date and time. Of course, this information may be automatically entered by the system, if so desired.

Line 114 of computer screen 110 illustrates the evaluation vote of the evaluator and requires the evaluator to enter an indication of his or her vote with regard to a particular disclosure. As illustrated, the evaluator may vote to initiate a search to determine possible patentability of the invention disclosure, may indicate that the invention disclosure should be published or closed, may indicate that he or she does not know what status should be assigned the invention disclosure, or may abstain from the vote.

Next, line 116 of computer screen 110 depicts an important statement to be utilized with regard to the automatic corroboration of an invention disclosure document in accordance with the method and apparatus of the present invention. Line 116 requires the evaluator to indicate that he or she has "Read and Understood" the entire invention disclosure, by entering an "X" in the appropriate space. Next, line 118 of computer screen 110 permits the evaluator to make an entry indicating whether or not he or she believes that further discussion is necessary with regard to this invention disclosure.

Line 120 of computer screen 110 permits the evaluator to enter an indication of his or her level of expertise with regard to the technical or functional area of the invention disclosure under consideration. Of course, those skilled in the art will appreciate that it is a simple matter to utilize this indication of expertise as a weighting factor in a voting process involving one or more evaluators with regard to a particular invention disclosure evaluation.

Finally, line 122 of computer screen 110 permits the evaluator to enter narrative comments with regard to a particular invention disclosure. These comments may be utilized by the Chairman of the Evaluation Committee to determine the strength of the evaluator's opinion or for utilization in preparing an agenda for a subsequent meeting, in the event the disposition of a particular disclosure is not clearly determined by the automatic evaluation process.

Figure 6:
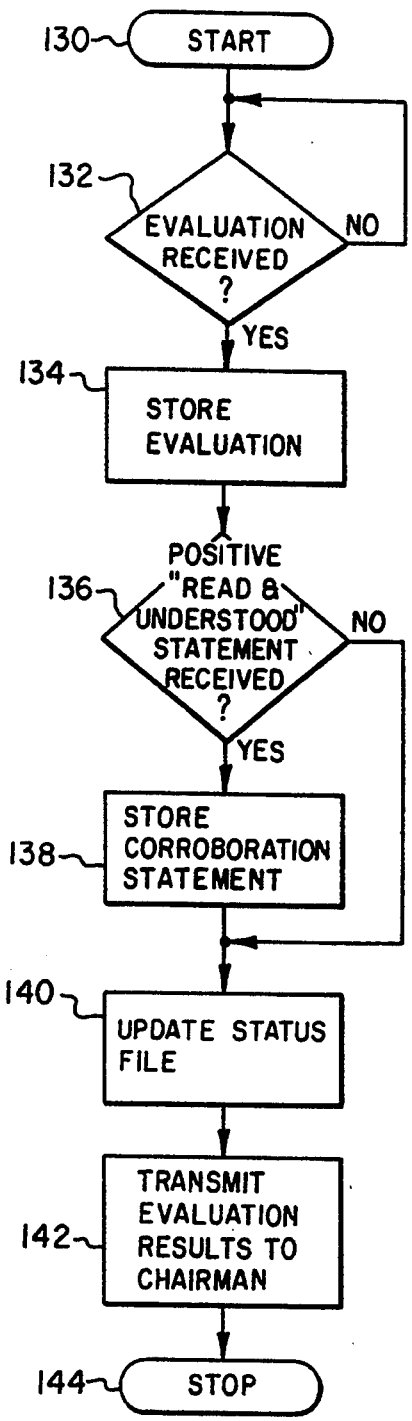
FIG. 6 is a high level flow chart depicting the storing of an evaluation of an electronic invention disclosure document in accordance with the method and apparatus of the present invention.

Referring to FIG. 6, there is depicted a high level flow chart which illustrates the storing of an evaluation and corroboration of an electronic invention disclosure document in accordance with the method and apparatus of the present invention. As 1 above, this process begins at block 130 and thereafter passes to block 132 which illustrates a determination of whether or not an evaluation of a particular invention disclosure document has been received. If not, the process merely iterates until such time as an evaluation is received.

After receiving an evaluation for an invention disclosure document, block 134 depicts the storing of that evaluation. The evaluation of a particular invention disclosure document may be stored at the evaluation facility, at the terminal of the Chairman of the Evaluation Committee, and/or at the disaster recovery site which has been utilized to store the backup copy of the invention disclosure document in question.

Next, block 136 illustrates a determination of whether or not a positive "Read and Understood" statement has been received in response to the prompting of the evaluator, which was depicted in block 98 of FIG. 4. In the event a positive "Read and Understood" statement is not received, the process directly passes to block 140. However, in the event a positive "Read and Understood" statement has been received from the evaluator in response to the prompting referred to above, block 138 illustrates the storing of this corroboration of the invention disclosure document. As above, this corroboration statement may be stored with the invention disclosure document at the evaluation facility, at the terminal of the Chairman of the Evaluation Committee, and/or at the disaster recovery site referred to above.

Next, after storing a positive corroboration statement which has been received, or in the event no positive corroboration statement has been received, block 140 illustrates the updating of the status file which was created as illustrated in block 82 of FIG. 3. As discussed above, this status file contains information regarding the status of a particular invention disclosure document and should thus be updated when an evaluation of the invention disclosure document has been received.

Finally, block 142 illustrates the transmitting of the evaluation results to the Chairman of the Evaluation Committee. This process permits the Chairman of an Evaluation Committee to make a final determination with regard to the status of a particular invention disclosure document, if the voting process has resulted in a clear cut indication of such status, or to schedule a meeting for discussion of a particular invention disclosure document, if the electronic voting process indicates a dichotomy among the members of the Evaluation Committee. Thereafter, as illustrated in block 144, the process terminates.

Figure 7:
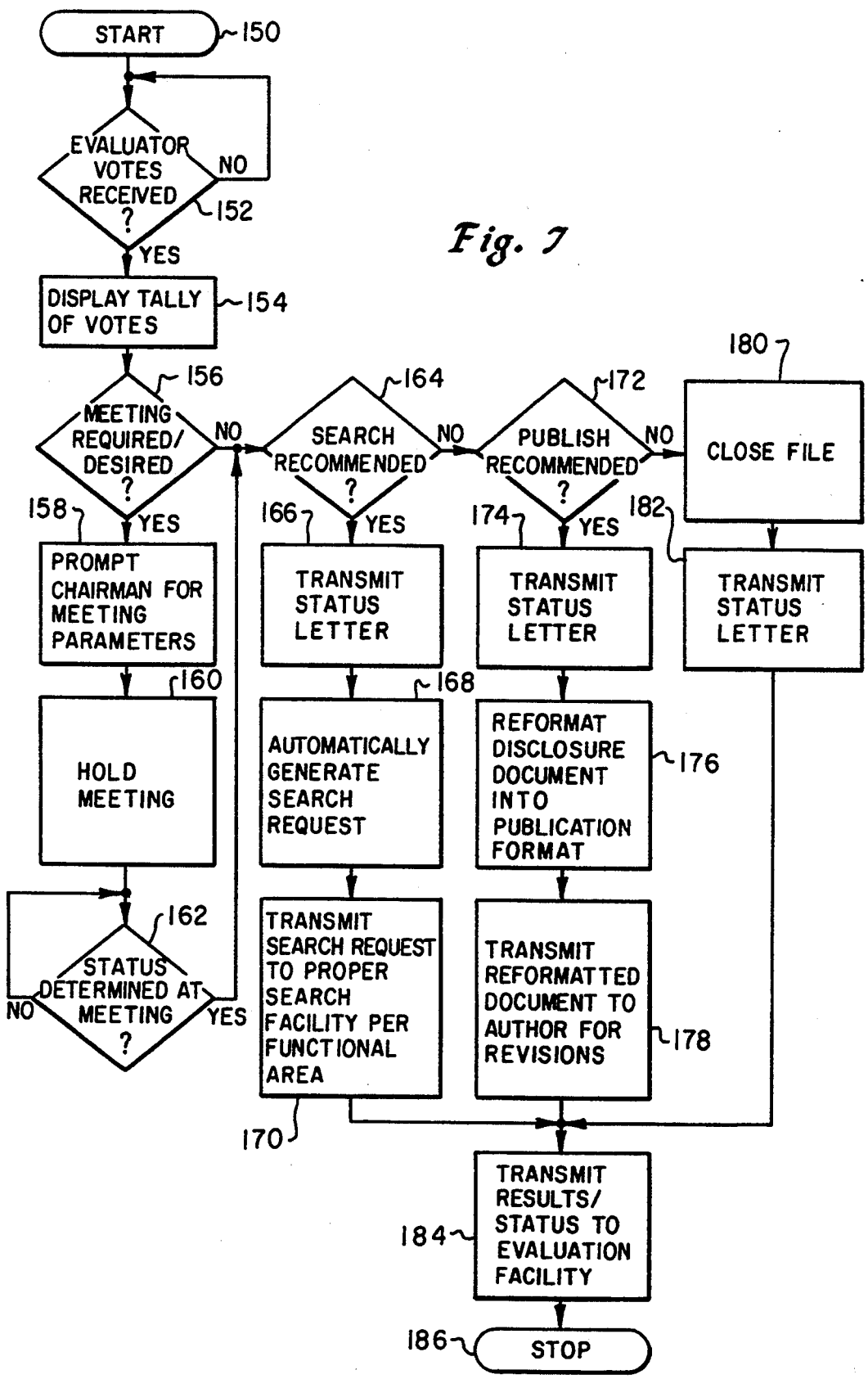
FIG. 7 is a high level flow chart depicting automatic report generation and the automatic initiation of additional procedures in response to stored evaluations of an invention disclosure document in accordance with the method and apparatus of the present invention.

With reference now to FIG. 7, there is depicted a high level flow chart which illustrates the automatic report generation and automatic initiation of additional procedures in response to stored evaluations of an invention disclosure document, in accordance with the method and apparatus of the present invention. As above, the process illustrated in FIG. 7 begins at block 150 and thereafter passes to block 152. Block 152 depicts a determination of whether or not evaluator votes have been received with regard to a particular invention disclosure document. If not, the process merely iterates until such time as one or more evaluator votes have been received. Of course, those skilled in the art will appreciate that a prompting message may be utilized to induce an evaluator to submit a vote for a particular invention disclosure document in the event the evaluator has not done so within a preselected period of time.

After evaluator votes for an invention disclosure document have been received, as determined in block 152, then block 154 illustrates the displaying of the tally of votes for the Chairman of the Evaluation Committee. This tally may take the form of any suitable visual summary so that the Chairman may determine whether or not the Evaluation Committee has rendered a result which automatically disposes of a particular invention disclosure document, or whether further action, such as a meeting is required.

Those skilled in the art will appreciate that a simple rule may be established regarding the number of votes by evaluators with regard to a particular invention disclosure document which are required to sustain a particular status for that document. That is, if a majority of evaluators vote for a particular resolution with regard to a specific invention disclosure document that resolution will be automatically implemented in accordance with the method and apparatus of the present invention.

However, it should also be noted that a weighting scheme for evaluator votes may also be utilized by incorporating the knowledge level of each evaluator, as discussed above. Further, it is anticipated that the Chairman of an Evaluation Committee may override or countermand the decision of the group of evaluators which might otherwise automatically initiate a selected procedure.

Thereafter, block 156 illustrates a determination of whether or not a meeting of the evaluators is required or desired in order to ascertain the proper status for a particular invention disclosure document. In the event a meeting of the evaluators is required or desired, then block 158 illustrates the prompting of the Chairman of the Evaluation Committee for a group of meeting parameters. Those skilled in the art will appreciate that by the term "meeting parameters" what is meant is a desired duration time for a meeting, a desired date range for a meeting and a desired list of attendees for that meeting.

Next, block 160 illustrates the occurrence of a meeting of the evaluators for discussions with regard to a particular invention disclosure document, in the event such a meeting is required or desired. Block 162 then indicates a determination of whether or not the status for a particular invention disclosure document has been determined at such a meeting and if not, the process merely iterates until such time as a status determination has been made. In the event a status determination with regard to a particular invention disclosure document does occur at a meeting then the process returns to block 164.

Referring again to block 156, if the evaluations of the evaluators concerned indicate that no meeting is required or desired, or, in the alternative, after the status of a particular invention disclosure document has been determined at a meeting, as indicated at block 162, the process passes to block 164.

Block 164 indicates a determination of whether or not the evaluations of the group of evaluators for a particular invention disclosure document have recommended that a search be conducted to determine the likelihood of patent protection for a particular invention disclosure. If so, the process passes to block 166. Block 166 illustrates the automated transmittal of a status letter to appropriate parties within the organization. In the depicted embodiment of the present invention, a status letter is automatically generated and transmitted to the author of the invention disclosure document as well as all co-inventors, appropriate management individuals for each co-inventor and all other personnel who have indicated a desire to maintain current knowledge on the status of a particular invention disclosure document.

Thereafter, block 168 depicts an important feature of the present invention which depicts the automatic generation of a search request. As discussed above, each invention disclosure document includes a functional area code which identifies the technical and/or functional area of the material contained therein. This code may be utilized, in conjunction with the search request generation illustrated within block 168, to automatically generate a search request which may include key words, phrases, or ancillary references which are determined by reference to the invention disclosure document. Thereafter, block 170 illustrates the automatic transmission of the search request to a proper search facility, which is determined in accordance with the functional area codes discussed above.

Referring again to block 164, in the event the evaluations of the evaluators for the particular invention disclosure document in question do not recommend that a search be conducted, block 172 illustrates a determination of whether or not publication of the invention disclosure document is recommended.

If, as determined in block 172, the evaluators of a particular invention disclosure document recommend that the invention disclosed therein be published the process passes to block 174, which illustrates the automated transmittal of a status letter in a manner described above with respect to block 166.

Thereafter, block 176 illustrates another important feature of the present invention. Block 176 depicts the reformatting of the invention disclosure document into a publication format. This, as those skilled in the art will appreciate, involves the removal of internal administrative data from the invention disclosure document and the alteration of the format to render the invention disclosure document into a format suitable for publication in a technical disclosure bulletin or other similar publication. Next, block 178 illustrates the transmitting of the reformatted document to the author of the invention disclosure document for additional revisions necessary to place this document in condition for publication.

Referring again to block 172, in the illustrated embodiment of the present invention, if a selected invention disclosure document is not recommended for a search or a publication the process passes to block 180 which illustrates the automatic closing of the file containing the invention disclosure document. Next, block 182 illustrates the automatic transmission of a status letter as described above.

Next, after a transmission of a search request, a transmission of the reformatted document or the transmission of a status letter to the author, as discussed above, the process passes to block 184. Block 184 illustrates the transmitting of a message including both the results of the evaluation and the status of the selected invention disclosure document to the evaluation facility, for utilization in updating the status file and maintaining a current list of the status of each invention disclosure document within the data processing system. Thereafter, the process terminates, as illustrated in block 186.

Upon reference to the foregoing those skilled in the art will appreciate that the Applicants in the present application have provided a method and apparatus whereby a plurality of documents, such as invention disclosure documents, may be automatically directed to a plurality of evaluators for evaluation as to the eventual status of those documents and wherein the content of the evaluations thus solicited may be utilized to automatically initiate one or more additional procedures within the data processing system. In this manner, the process of administratively handling invention disclosure documents, or any other document which is evaluated within a data processing system, may be greatly enhanced and accelerated without the necessity of additional human intervention.

While the invention has been particularly shown and described with reference to a preferred embodiment, it will be understood by those skilled in the art that various changes in form and detail may be made therein without departing from the spirit and scope of the invention.

We claim:

1. A method in a data processing system having a plurality of users enrolled therein for automatically initiating additional procedures with regard to a document stored within said data processing system, said method comprising the steps of:

identifying a document stored within said data processing system and a functional area associated with said document;

automatically soliciting an evaluation vote regarding said document from a selected group of said plurality of users enrolled within said data processing system, said selected group of said plurality of users automatically determined in response to said identification of said functional area associated with said document;

storing within said data processing system each evaluation vote regarding said document received from said selected group of said plurality of users; and thereafter utilizing said data processing system to automatically initiate a selected procedure with regard to said document among a plurality of procedures within said data processing system in response to an assessment of said stored evaluation votes regarding said document from said selected group of said plurality of users.

2. The method in a data processing system having a plurality of users enrolled therein for automatically initiating additional procedures with regard to a document stored within said data processing system according to claim 1, further including the step of displaying a summary of said evaluations of said document from said selected group of said plurality of users.

3. The method in a data processing system having a plurality of users enrolled therein for automatically initiating additional procedures with regard to a document stored within said data processing system according to claim 1, further including the step of automatically transmitting a report in response to an initiation of said selected procedure.

4. The method in a data processing system having a plurality of users enrolled therein for automatically initiating additional procedures with regard to a document stored within said data processing system according to claim 1, wherein said selected procedure comprises the automatic reformatting of said document into a selected format.

5. The method in a data processing system having a plurality of users enrolled therein for automatically initiating additional procedures with regard to a document stored within said data processing system according to claim 1, wherein said selected procedure comprises the closing of a file containing said document.

6. A system for automatically initiating an additional procedure with regard to a document stored within a data processing system having a plurality of users enrolled therein, said system comprising:

means for identifying a selected document stored within said data processing system and a functional area associated with said document;

data entry means for permitting entry of an evaluation vote regarding said selected document by a selected group of users enrolled in said data processing system, said selected group of said plurality of users automatically determined in response to said identification of said functional area associated with said document;

storage means for storing within said data processing system each evaluation vote regarding said selected document by said selected group of users enrolled in said data processing system; and data processing system means for automatically initiating a selected procedure with regard to said document among a plurality of procedures within said data processing system in response to an assessment of said stored evaluation votes regarding said document from said selected group of said plurality of users.

7. The system for automatically initiating an additional procedure with regard to a document stored within a data processing system according to claim 6, further including means for displaying a summary of said evaluations of said selected document by said selected group of users.

8. The system for automatically initiating an additional procedure with regard to a document stored within a data processing system according to claim 6, further including means for automatically transmitting a report in response to an initiation of said selected procedure.

* * * * *